United States Patent [19]
Oximberg

[11] Patent Number: 5,463,300
[45] Date of Patent: Oct. 31, 1995

[54] AC MOTOR CONTROLLER WITH 180 DEGREE CONDUCTIVE SWITCHES

[76] Inventor: Carol A. Oximberg, 415 N. Bronson Ave., Los Angeles, Calif. 90004

[21] Appl. No.: 112,160

[22] Filed: Aug. 26, 1993

[51] Int. Cl.$^6$ .................................................... H02P 5/34
[52] U.S. Cl. .................... 318/801; 318/798; 318/811; 318/807; 318/799
[58] Field of Search ................... 318/801, 798, 318/811, 807, 803, 808, 799; 363/40, 41, 137, 138

[56] References Cited

U.S. PATENT DOCUMENTS

| | | | |
|---|---|---|---|
| 4,002,958 | 1/1977 | Akamatsu | 318/801 |
| 4,212,056 | 7/1980 | Kitamura et al. | 318/801 |
| 4,736,148 | 4/1988 | Hirata | 318/801 |

Primary Examiner—William M. Shoop, Jr.
Assistant Examiner—Karen Masih
Attorney, Agent, or Firm—John R. Rafter

[57] ABSTRACT

An ac motor controller is operated by a modified time-switching scheme where the switches of the inverter are "on" for electrical-phase-and-rotation intervals of 180° as opposed to the conventional 120°. The motor is provided with three-phase drive windings, a power inverter for power supplied from a dc power source consisting of six switches, and a motor controller which controls the current controlled switches in voltage-fed mode. During full power, each switch is gated continuously for three successive intervals of 60° and modulated for only one of said intervals. Thus, during each 60° interval, the two switches with like signs are "on" continuously and the switch with the opposite sign is modulated.

6 Claims, 4 Drawing Sheets

| INTERVALS | TRANSISTORS ON | POLARITIES AT TERMINALS A B C |
|---|---|---|
| 0° TO 60° | $Q_1$, $Q_6$, $Q_5$ | + − + |
| 60° TO 120° | $Q_1$, $Q_6$, $Q_2$ | + − − |
| 120° TO 180° | $Q_1$, $Q_3$, $Q_2$ | + + − |
| 180° TO 240° | $Q_4$, $Q_3$, $Q_2$ | − + − |
| 240° TO 300° | $Q_4$, $Q_3$, $Q_5$ | − + + |
| 300° TO 360° | $Q_4$, $Q_6$, $Q_5$ | − − + |

AC MOTOR CONTROLLER WITH 180 DEGREE CONDUCTIVE SWITCHES

FIELD OF TECHNOLOGY

The invention described herein was made in performance of work under NASA Contract No. NAS9-18200 and is subject to the provisions of Section 305 of the National Aeronautics Space Act of 1985 (42U.S.C.2457).

The present invention relates to ac motor control. More particularly, the invention relates to a current controlled, ac motor controlled, though an inverter that operates in voltage-fed mode for three-phase operation.

BACKGROUND

Various types of current control systems are available for ac motors. The present invention controller includes a current controlled inverter for converting variable dc power into ac phase power. For a three-phase ac drive mode, the inverter consists of six switches with two switches for each phase in totem pole arrangement such that the collector of the high side switch is connected to the dc link high, the emmiter of the low switch is connected to the dc link return and the junction is connected to the phase windings. The high speed transistor switches are alternately turned on and off based on a predetermined switching pattern.

Inversion is accomplished through a phase shift of the transistors to produce phase and line voltages displaced by 120°. This three-phase output voltage is applied to the stator windings of the motor. In the conventional scheme, each transistor is turned "on" during an electrical-phase-and-rotation interval of 120°.

Various motor controllers have been designed to eliminate the disadvantages inherent in the conventional systems of this kind such as U.S. Pat. No. 4,547,719 which is designed to prevent adverse effects due to the dead zone of the pulse-modulation system and U.S. Pat. No. 4,761,599 which is intended to reduce electro-magnetic noise during forward rotation for a forward and reverse system. However, a need still exists for a system which can increase the power delivered to a motor from a given dc voltage supply. Also, a system which decreases the distortion of voltages and currents at high powers is very desirable.

SUMMARY OF THE INVENTION

An object of the present invention is to provide a motor controller which will increase the power delivered to a motor from a given dc voltage supply.

Another objective is to provide a inverter method of operating a motor controller that reduces the losses due to high frequency switching.

Still another objective is to provide an inverter method of operating a motor controller which can increase the efficiency of the motor by decreasing the distortions of voltages and currents at high powers.

The present invention accomplishes the above-mentioned objectives through the use of a modified time-switching scheme where the switches of the inverter are "on" for electrical-phase-and-rotation intervals of 180° as opposed to the conventional 120°. The present invention provides a motor with three-phase drive windings, a power inverter for power supplied from a dc power source consisting of six switches, and a motor controller which controls the current controlled switches in voltage-fed mode. During full power, each switch is gated continuously for three successive intervals of 60° and modulated for only one of said intervals. Thus, during each 60° interval, the two switches with like signs are "on" continuously and the switch with the odd sign is modulated.

DESCRIPTION OF THE PREFERRED EMBODIMENT

Figures 1, 2:
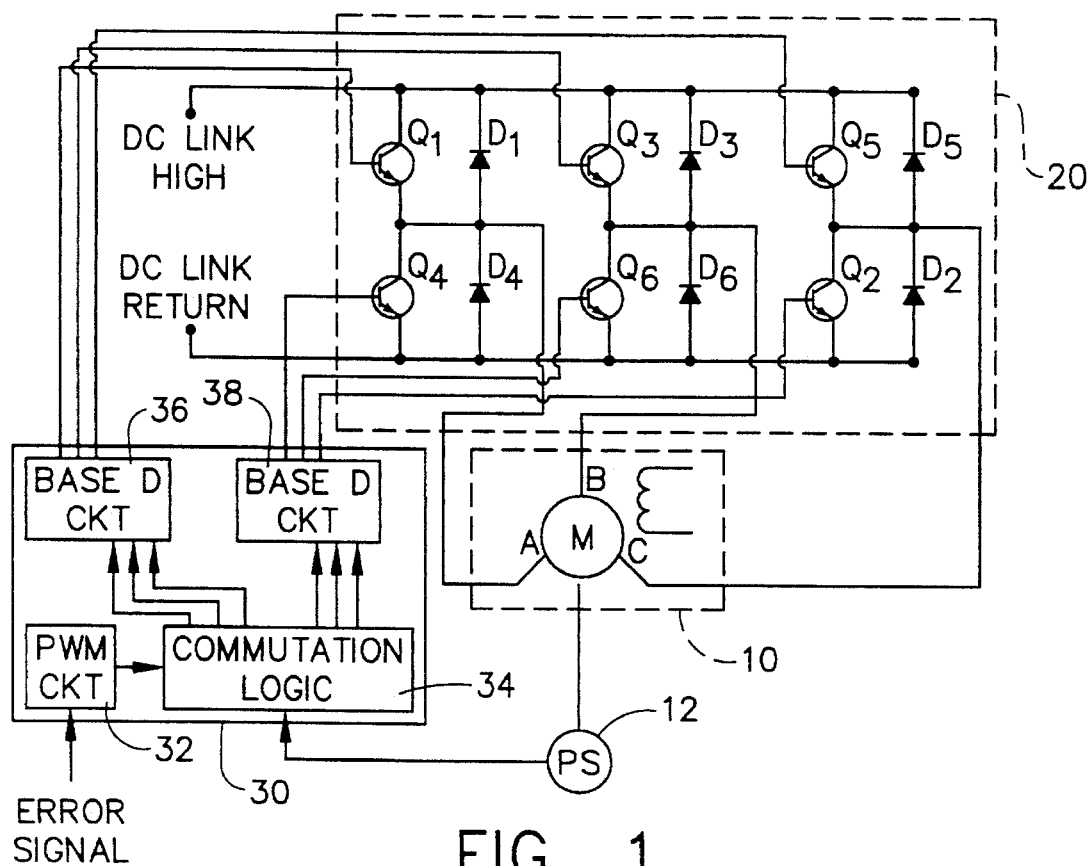
FIG. 1 is a construction diagram of a motor controller according to one embodiment of the present invention.
FIG. 2 is a truth table for the transistors and the corresponding polarities at the motor terminals.

FIG. 1 shows the construction of a motor controller according to one preferred embodiment of the present invention. The figure shows a synchronous motor 10 with a permanent magnet rotor and three-phase drive windings with terminals A, B and C respectively. Connected to the motor 10 is position sensors 12 for detecting the rotor position with respect to the stator windings and providing rotor position signal X, Y, and Z shown in FIG. 3.

An inverter 20 receives power from a dc power supply (not shown). The inverter is comprised of six transistor switches, $Q_1$, $Q_2$, $Q_3$, $Q_4$, $Q_5$ and $Q_6$ and six recovery diodes, $D_1$, $D_2$, $D_3$, $D_4$, $D_5$ and $D_6$. The collectors of transistors $Q_1$, $Q_3$, and $Q_5$ are connected to a dc link high and the emmiters of $Q_2$, $Q_4$, and $Q_6$ are connected to the dc link return.

The transistor switches operate from signals sent by the motor controller 30 which includes the PWM circuit 32 for controlling the motor current and thereby the motor torque, by adjusting the duty cycle of each transistor. The input to the PWM is the error signal from the current regulator. This signal is compared to a high frequency carrier signal (not shown) to create the PWM output signal. The signal from the PWM circuit 32 is sent to a commutation logic 34 which also receives the rotor position signals X, Y, and Z from the position sensor 12. The commutation logic 34 sends motor control signals to the base drive circuits 36 and 38 which control the base current of the transistors. The commutation logic 34 provides commutation commands A+, A−, B+, B−, C+ and C− which turn "on" and "off" the transistors $Q_{1-6}$, according to rotor position as seen in the truth table in FIG. 2. This allows power to be applied to the selected phase windings A, B and C of motor 10. The commutation commands A+, B+ and C+ are supplied to the respective gates of the three upper transistors $Q_1$, $Q_3$, and $Q_5$. The commutation commands A−, B− and C− are supplied to the respective gates of the three lower transistors $Q_4$, $Q_6$, and $Q_2$.

The commutation logic 34 generates the commutation commands according to the rotor position signal shown in FIG. 2. FIG. 2 shows that each of the transistors, during full power, is "on" for three consecutive 60° intervals for a total of 180°. Thus, during each 60° interval, three transistors are "on", rather than turning two transistors "on" as in the conventional 120° control circuits. During the interval where the rotor position is between 0° and 60° commutation commands A+, B− and C+ are supplied to the transistors $Q_1$, $Q_6$, and $Q_5$. When the rotor is between 60° and 120°, the transistors $Q_1$, $Q_6$, and $Q_2$ are turned "on". When rotor is between 120° and 180°, the transistors $Q_1$, $Q_3$ and $Q_2$ are turned "on".

The PWM is created by modulating the single switch that is sending the opposite sign. This is the transistor that is sending the odd signal. Since transistor $Q_6$ is the only negative signal, it is the odd signal during the 0°–60° interval. Thus, $Q_6$ is the transistor being modulated. During the "off" time of the modulation, the current is redirected from motor terminal B through diode $D_3$ to the dc link high. By doing so, the current on each phase of the motor is controlled. The duty cycle of each transistor that sends the odd signal is varied to maintain the motor current at the command value. Thus in the 60°–120° interval, transistor $Q_1$ would be modulated with the current being redirected from motor terminal A thru diode $D_4$. During the next 60° interval transistor $Q_2$ would be modulated followed by transistor $Q_3$ then by transistor $Q_4$ and by transistor $Q_5$ before the cycle starts over again with transistor $Q_6$ being modulated.

Figure 3:
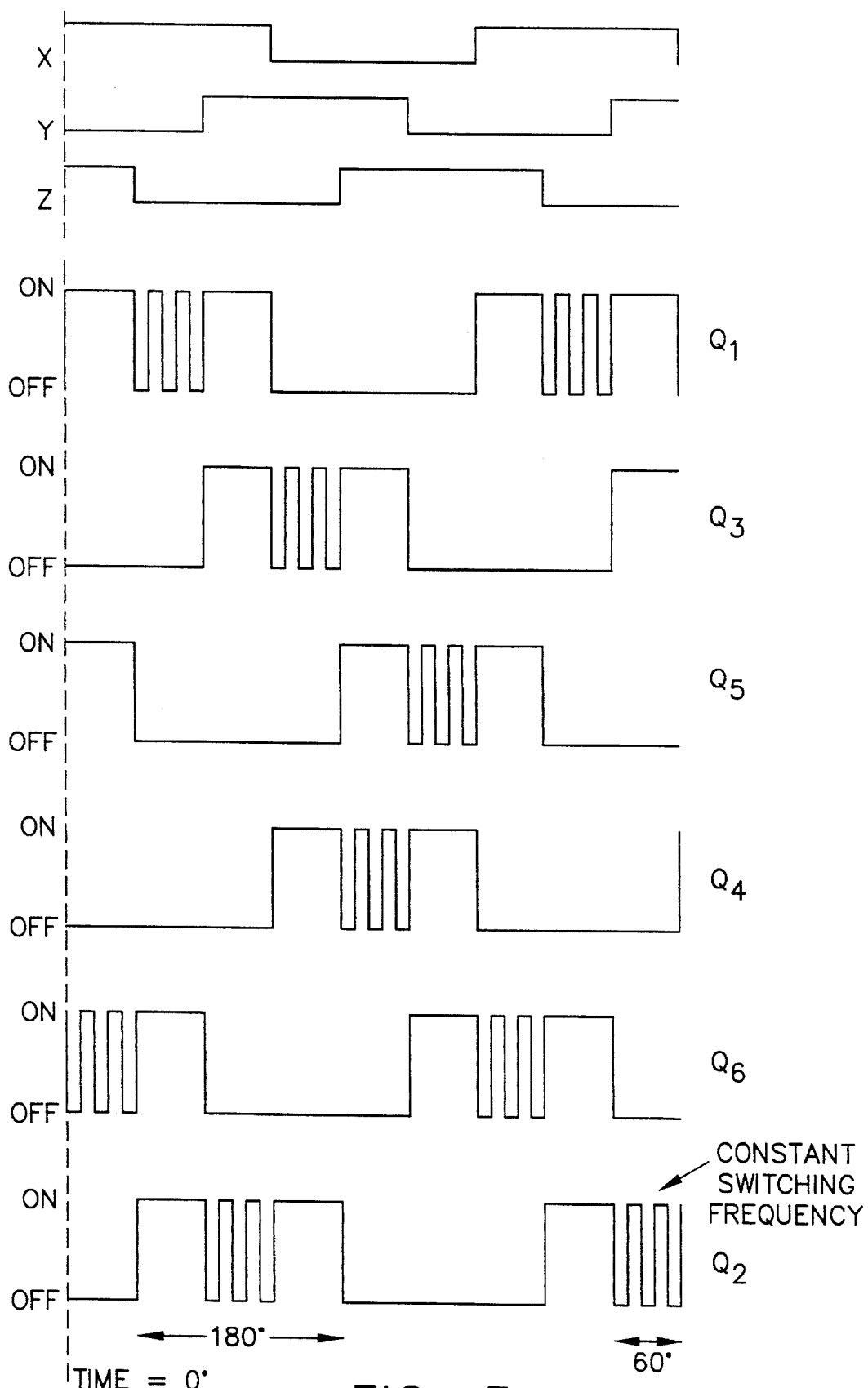
FIG. 3 is the transistor gate patterns for transistors $Q_{1-6}$.

FIG. 3 shows the transistor gate patterns. The figure indicates that each transistor is gated for 180° and that during every 60° interval just one transistor is modulated. This switching pattern insures minimum inverter switching losses and prevents the short circuiting of the system.

Figure 4:
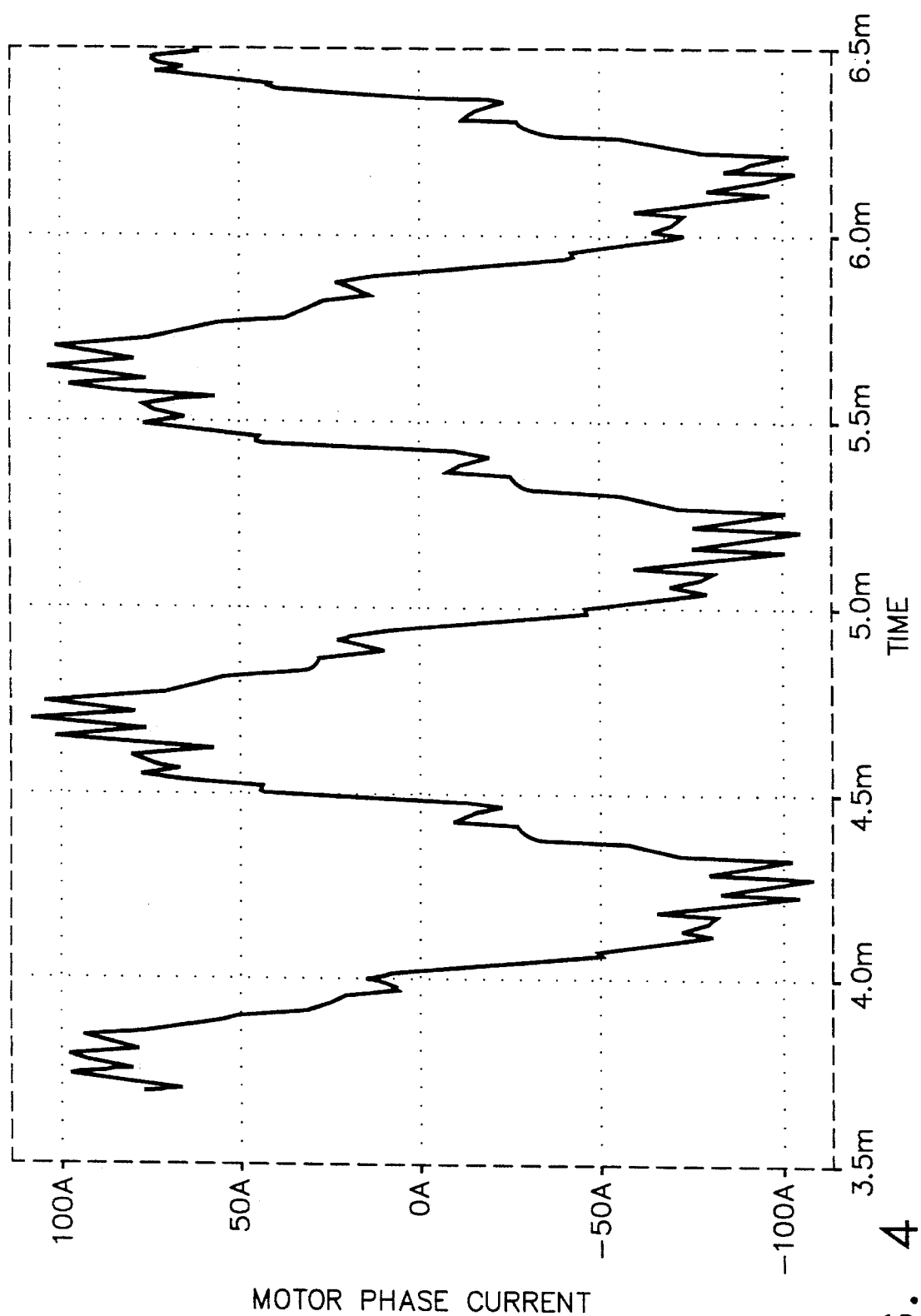
FIG. 4 is the simulated motor phase current for the present invention.
Figure 5:
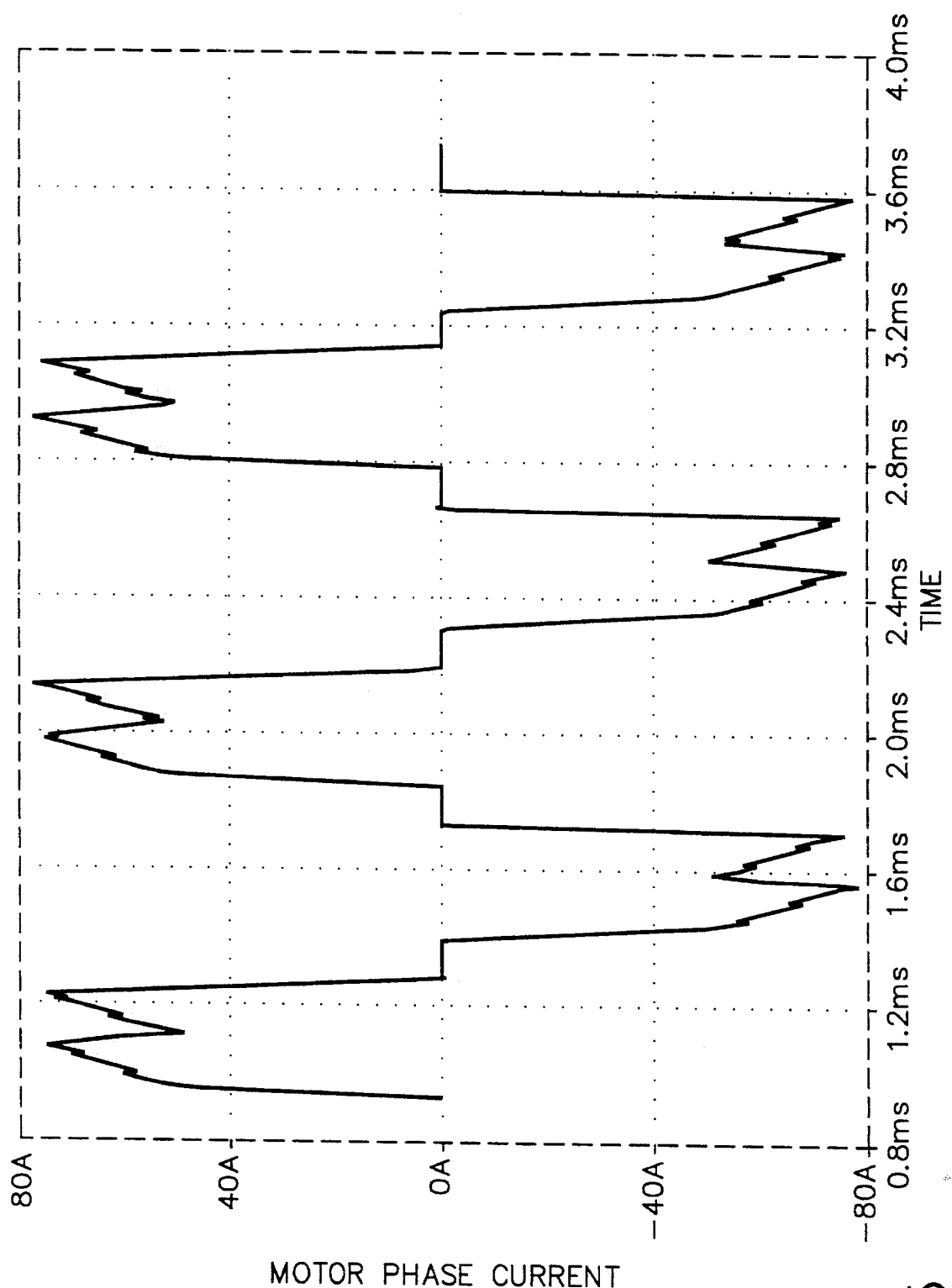
FIG. 5 is the simulated motor phase current for the conventional (prior art) situation.

FIG. 4 shows the simulated motor phase current produced by this modulation scheme. The motor current waveform is closer to a sinusoid and the harmonic content is smaller than that of the conventional 120° conduction for the same electrical drive characteristics. (See FIG. 5.)

The inverter reactive power is minimized by controlling the motor power factor. The controller 30 maintains the motor current in phase with the motor voltage.

The invention can be applied to electric drives that include permanent magnet or wound field synchronous motors as well as induction motors. The invention can also be practiced to control the power delivered to three phase static loads.

It will be understood that this embodiment is merely exemplary and that a person skilled in the art may make many variations and modifications without departing from the spirit and scope of the invention. All such modifications are intended to be included within the scope of the invention as defined in the appended claims.

I claim:

1. An apparatus for controlling an ac motor having a rotor, stator windings, and sensors for generating position signals that indicate the position of the rotor with respect to the stator windings, said apparatus comprising:

commutation means, responsive to said position signals, for generating commutation commands an inverter means for energizing selected stator windings, said inverter means having three switches being gated by the commutation commands whereby at least two of the switches are continuously on for three consecutive 60 degree intervals and the other switch is modulated.

2. An apparatus according to claim 1, wherein the switches energize selected stator windings having the same polarity and one switch with the opposite polarity is modulated by signals sent by the commutation means.

3. An apparatus according to claim 2 wherein the commutation means further includes a pulse width modulation circuit which receives an error signal from a closed loop current control circuit that is compared to a high frequency carrier signal to create a pulse width modulated output signal.

4. An apparatus according to claim 3 wherein a different switch is modulated only once in six consecutive 60 degree intervals.

5. A system comprising:

a motor having a rotor and stator windings;

position sensors for providing position signals indicative of said rotor position with respect to said stator windings;

an inverter having two switches in totem pole arrangement for each of said stator windings, said switches being gated by a commutation commands; and commutation logic responsive to said position signals and a pulse-modulation signal for generating said commutation commands such that during every 360 degree interval, one of said two switches having the same polarity is on for every stator winding and only one of said on switches is modulated during a 60 degree interval.

6. The system in claim 5, wherein said modulated switch sends modulated signals according to the opposite polarity as the other switches.

* * * * *